US008459295B2

(12) United States Patent
Kim et al.

(10) Patent No.: US 8,459,295 B2
(45) Date of Patent: Jun. 11, 2013

(54) LOCALIZED DROPLET HEATING WITH SURFACE ELECTRODES IN MICROFLUIDIC CHIPS

(75) Inventors: Chang-Jin Kim, Beverly Hills, CA (US); Wyatt C. Nelson, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 69 days.

(21) Appl. No.: 13/144,462

(22) PCT Filed: Jan. 19, 2010

(86) PCT No.: PCT/US2010/021402
§ 371 (c)(1),
(2), (4) Date: Jul. 13, 2011

(87) PCT Pub. No.: WO2010/141104
PCT Pub. Date: Dec. 9, 2010

(65) Prior Publication Data

US 2011/0272575 A1 Nov. 10, 2011

Related U.S. Application Data

(60) Provisional application No. 61/145,882, filed on Jan. 20, 2009.

(51) Int. Cl.
*H05B 3/03* (2006.01)
*G01N 27/06* (2006.01)
*G01N 21/69* (2006.01)

(52) U.S. Cl.
USPC ........... 137/341; 250/288; 219/482; 219/546; 204/600

(58) Field of Classification Search
USPC .... 137/341; 250/288; 219/482, 546; 204/600
See application file for complete search history.

(56) References Cited

U.S. PATENT DOCUMENTS

| | | | | |
|---|---|---|---|---|
| 7,216,660 | B2 | 5/2007 | Troian et al. | |
| 2004/0058450 | A1* | 3/2004 | Pamula et al. | 436/150 |
| 2006/0097155 | A1 | 5/2006 | Adachi et al. | |
| 2007/0045117 | A1* | 3/2007 | Pamula et al. | 204/600 |
| 2010/0096266 | A1* | 4/2010 | Kim et al. | 204/451 |
| 2012/0264932 | A1* | 10/2012 | Van Dam et al. | 536/122 |

FOREIGN PATENT DOCUMENTS

| | | | |
|---|---|---|---|
| EP | 1777719 | B1 | 4/2007 |
| JP | 2006125900 | A | 5/2006 |

OTHER PUBLICATIONS

Chang, Yi-Hsien et al., Integrated polymerase chain reaction chips utilizing digital microfluidics, Biomed Microdevices (2006) 8:215-225.

(Continued)

*Primary Examiner* — Nikita Wells
(74) *Attorney, Agent, or Firm* — Vista IP Law Group LLP

(57) ABSTRACT

A microfluidic device for droplet manipulation includes a substrate, a plurality of electrically addressable thin-film electrodes disposed on the substrate, at least one of the plurality of electrodes comprising a heating element in the form of a patterned electrode. A hydrophilic region is disposed in or above a portion of the heating element. The hydrophilic region may be permanent or electronically actuable. The thin-film electrodes have multi-function capabilities including, for instance, heating, temperature sensing, and/or sample actuation.

20 Claims, 9 Drawing Sheets

OTHER PUBLICATIONS

Hsieh, Tseng Ming et al., PCR by moving a free droplet over different temperature zones, Institute of Bioengineering and Nanotechnology, The 10th International Conference in Miniaturized Systems for Chemistry and Life Sciences (TAS2006) Nov. 5-9, 2006, Tokyo, Japan, pp. 1088-1090.

Neuzil, Pavel et al., Ultra fast miniaturized real-time PCT: 40 cycles in less than six minutes, Nucleic Acids Research, 2006, vol. 34, No. 11, e77, Published online Jun. 28, 2006, pp. 1-9.

Pipper, Juergen et al., Clockwork PCT including sample preparation, Lab on Chip, Angew. Chem. It. Ed. 2008, 47, 3900-3904.

Yeh, Hsin-Chin, Fabrication and Cooling Test of High-Aspect-Ratio Electroplated Microchannels, University of California, Los Angeles, 1998, pp. 1-104.

Yoo, Jung Yul, Recent Studies on Fluid Flow and Heat Transfer in Thermal Microdevices, Nanoscale and Microscale Thermophysical Engineering, 10: 67-81, 2006.

PCT International Search Report for PCT/US2010/021402, Applicant: The Regents of the University of California, Form PCT/ISA/210 and 220, dated Dec. 14, 2010 (5 pages).

PCT Written Opinion of the International Search Authority for PCT/US2010/021402, Applicant: The Regents of the University of California, Form PCT/ISA/237, dated Dec. 14, 2011 (4pages).

PCT International Preliminary Report on Patentability (Chapter I of the Patent Cooperation Treaty) for PCT/US2010/021402, Applicant: The Regents of the University of California, Form PCT/IB/326 and 373, dated Aug. 4, 2011 (6pages).

Cho, Sung Kwon et al., Creating, Transporting, Cutting, and Merging Liquid Droplets by Electrowetting-Based Actuation for Digital Microfluidic Circuits, Journal of Microelectromechanical Systems, vol. 12, No. 1, Feb. 2003, pp. 70-80.

Wei, Jen-Hung et al., Realizing Temperature-Controlled Digital Microfluidic Chips with Versatile Microeclectrodes, The 2nd IEEE International Conference on NanoMicro Engineered and Molecular Systems, Jan. 16-19, 2007, Bangkok, Thailand, pp. 981-984.

Niu, Zhi Qiang et al., DNA amplification on a PDMS-glass hybrid microchip, J. Micromech. Microeng. 16 (2006) 425-433.

* cited by examiner

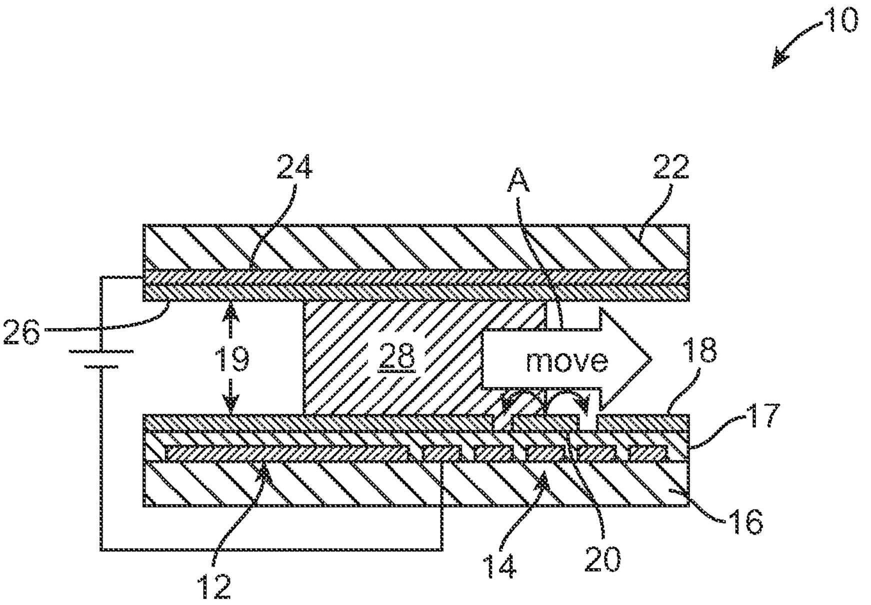
FIG. 2A
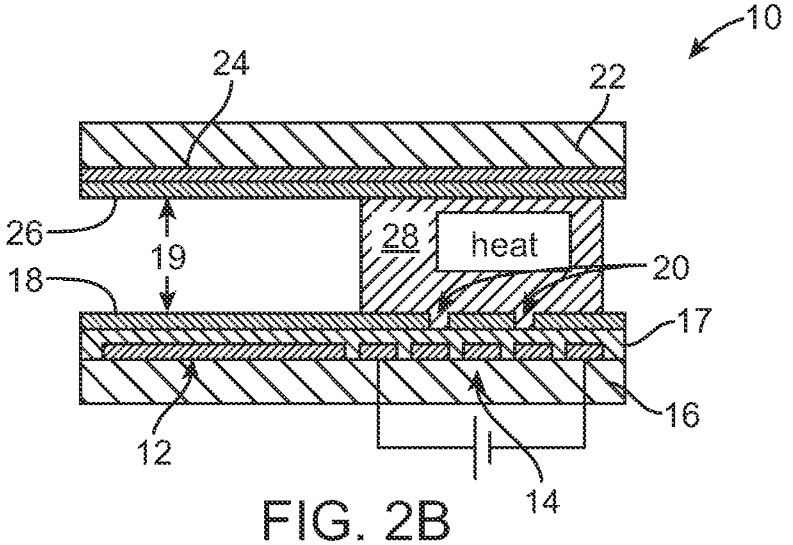
FIG. 2B
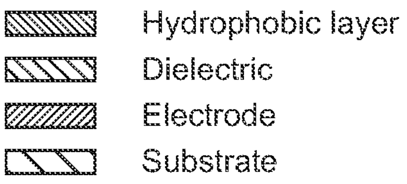

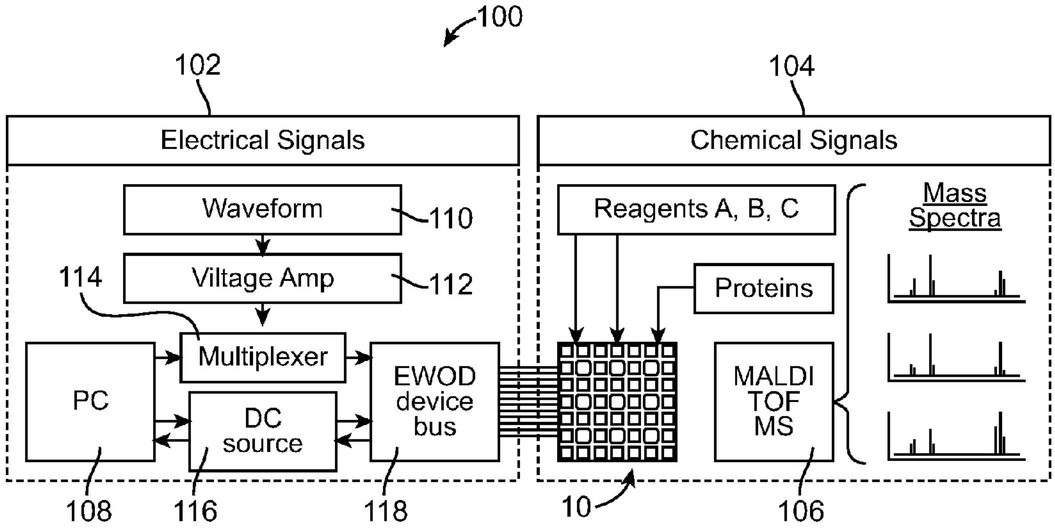
FIG. 8
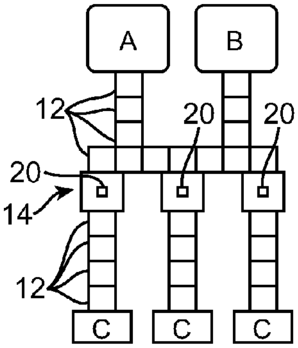
FIG. 9
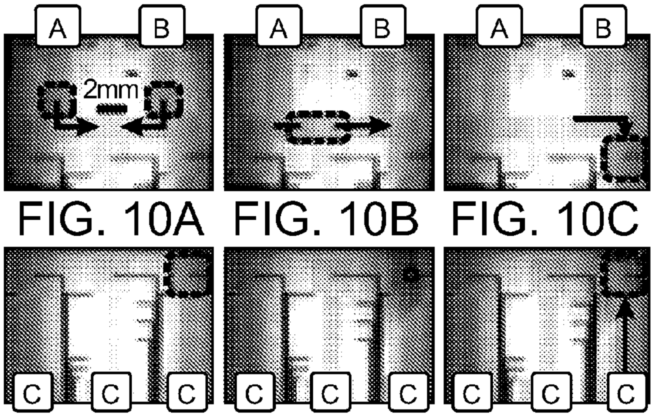
FIG. 10A FIG. 10B FIG. 10C
FIG. 10D FIG. 10E FIG. 10F

LOCALIZED DROPLET HEATING WITH SURFACE ELECTRODES IN MICROFLUIDIC CHIPS

REFERENCE TO RELATED APPLICATIONS

This Application is a U.S. National Stage filing under 35 U.S.C. §371 of International Application No. PCT/US2010/021402, filed Jan. 19, 2010, which claims priority of U.S. Provisional Patent Application No. 61/145,882 filed on Jan. 20, 2009. The contents of the aforementioned applications are incorporated by reference as if set forth fully herein. Priority to the aforementioned application is hereby expressly claimed in accordance with 35 U.S.C. §§119, 120, 365 and 371 and any other applicable statutes.

STATEMENT REGARDING FEDERALLY SPONSORED RESEARCH AND DEVELOPMENT

This invention was made with Government support of Grant No. F32 EB003696, awarded by the National Institutes of Health. The Government has certain rights in this invention.

FIELD OF THE INVENTION

The field of the invention generally relates to droplet-based (also called digital) microfluidic devices and methods. More specifically, the field of the invention relates to the use of thin-film electrodes located on or near the surface of microfluidic chips. The thin-film electrodes have multi-function capabilities including, for instance, heating, temperature sensing, and/or sample actuation.

BACKGROUND OF THE INVENTION

One challenging goal of biochemical microfluidics is the ability to build small, often thumbnail-sized chips capable of automatically performing assays that would otherwise require laboratory equipment, technicians, and hours of processing time. This requires shrinking the dimensions of samples and processing devices (e.g., ovens, mixtures, etc.) several orders of magnitude. Micro-electro-mechanical systems (MEMS) manufacturing techniques enable fabrication of a vast array of small, miniaturized features to be created on the chip. In this regard, MEMS offers the ability to create true laboratory-on-chip miniaturized devices. To realize their full potential, however, the device should not only control the location and composition of sub-microliter samples, but also the conditions such as temperature, pressure, and electrical signals in and around working fluids.

Certain biochemical assays and processes require particular thermal management requirements. For example, microfluidic devices have been used successfully for miniaturizing biochemical assay protocols that require thermal cycling such as polymerase chain reaction (PCR). Oft-cited advantages of using microscale fluid volumes include lower waste and reagent usage, faster processing time (e.g., rapid heating and cooling, shorter diffusion length), potentially higher throughput, efficiency, and levels of automation. For example, resistive heating and temperature-sensing elements can be integrated into microfluidic chips, often as thin-film platinum wires. While many reported lab-on-a-chip systems use integrated heating elements and temperature sensors to eliminating the need for macroscale thermal components (which add bulk and thermal crosstalk), they commonly require external pumps and valves for pressure-driven fluid handling. Interfacing macroscale tubes with microfluidic chips in inhibits scalability and parallelization.

Driving mechanisms such as externally applied pressure and electroosmosis can provide excellent control of flow rates in continuous flow microfluidic channels, but problems can arise due to excessive power consumption, analyte dispersion, and, for electrokinetic mechanisms, electrolysis and Joule heating in the working fluid.

SUMMARY OF THE INVENTION

In a first embodiment of the invention, a microfluidic device for droplet manipulation includes substrate, a plurality of electrically addressable electrodes disposed on the substrate, at least one of the plurality of electrodes comprising a heating element in the form of a patterned electrode, and a hydrophilic region disposed in or above a portion of the heating element.

In another embodiment, a method of heating a droplet includes moving a droplet over a plurality of electrically addressable electrodes disposed on the substrate, at least one of the plurality of electrodes comprising a heating element in the form of a patterned electrode, wherein the droplet is stopped on or above the at least one heating element, and applying an electrical current to the at least one heating element to heat the droplet.

In still another embodiment of the invention, a microfluidic chip includes a lower substrate, a plurality of electrically addressable EWOD electrodes disposed on the lower substrate, at least one of the plurality of EWOD electrodes comprising a heating element in the form of a patterned electrode also comprising resistance temperature detector, and an upper substrate disposed away from the lower substrate via one or more interposed spacers.

BRIEF DESCRIPTION OF THE DRAWINGS

FIG. 2A illustrates a schematic side view representation of a DFM chip. The DFM chip includes a moving droplet when the underlying electrode is applied with a voltage that is equipotential and grounded through the droplet.

FIG. 2B illustrates a schematic side view representation of a DFM chip. The DFM chip illustrates the droplet being heated by application of a voltage across the heating element.

FIG. 8 illustrates a system diagram of an on-chip proteomics system that includes sample processing and characterization by matrix-assisted laser desorption/ionization mass spectrometry (MALDI-MS).

FIG. 9 is a top schematic view of an EWOD chip for proteomics sample preparation. Heating sites are the three (3) relatively large boxes in the middle, containing small dark square rings, which depict hydrophilic regions.

FIGS. 10A-10F are selected video frame images of MALDI-MS sample preparation by EWOD with localized heating. FIG. 10A illustrates the creation and merging of ~500 nL solutions of insulin (A) and DTT (B). FIG. 10B illustrates mixing. FIG. 10C illustrates movement of ~1 μL sample to a heating site. FIGS. 10D and 10E illustrate heating. FIG. 10F illustrates addition of the matrix. Black dotted lines and arrows indicate droplet locations and moving paths, respectively.

DETAILED DESCRIPTION OF THE ILLUSTRATED EMBODIMENTS

Unlike driving mechanisms that rely on macroscale components, droplet-based, or digital systems, excluding two-phase channel flows, alternatively use mechanisms including electrowetting, dielectrophoresis, or thermocapillarity to drive discrete droplets without physical pumps or valves. For example EWOD refers to the electromechanical force that pulls a conductive liquid toward an electric field applied across an underlying dielectric layer. In this way, droplet manipulation is enacted via electrical signals. For example, electrical signals applied to individual electrodes within an array can create, transport, cut, and merge nanoliter-sized and picoliter-sized droplets by electrowetting-based actuation. This is described, for instance, the publication entitled *Creating, Transporting, Cutting, and Merging Liquid Droplets by Electrowetting-Based Actuation for Digital Microfluidic Circuits* by Sung Kwon Cho et al., Journal of MEMS, Vol. 12, No. 1, 2003, which is incorporated by reference as if set forth fully herein.

Droplet or digital microfluidic (DMF) chips using EWOD actuation can be accomplished in a reconfigurable fashion. DMF chips can be manufactured using relatively straightforward thin-film processes derived from integrated circuit fabrication steps, which can be redesigned in order to integrate on-chip transducers for local temperature control with EWOD fluidic handling. A key virtue of integrating temperature control with EWOD fluidic handling is that integrated functionalities are added without complicating the fabrication process.

Figure 1:
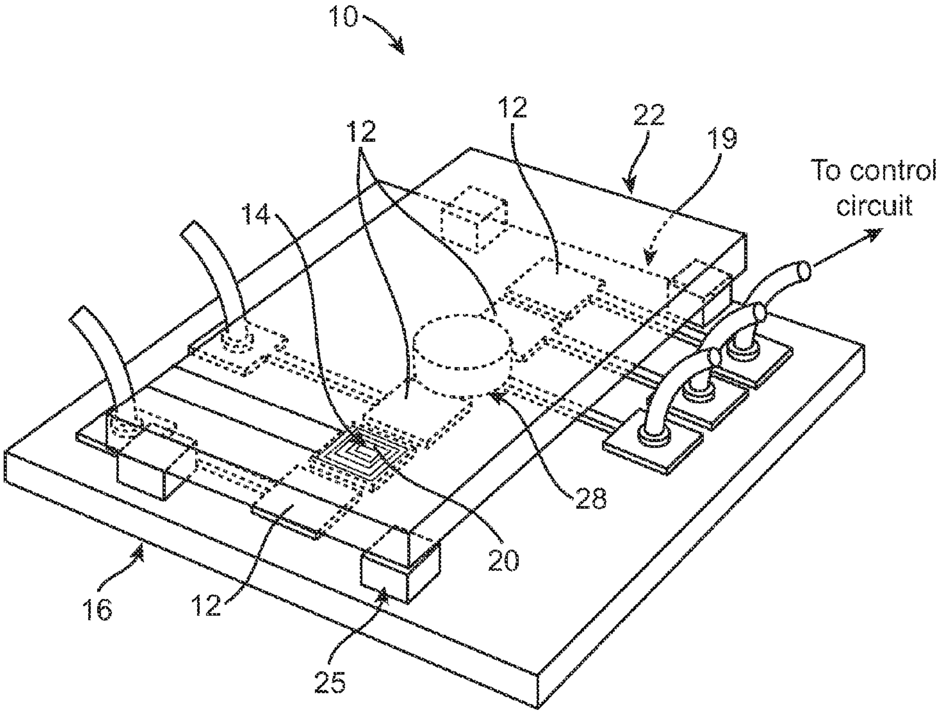
FIG. 1 illustrates a top down schematic of a DMF chip according to one embodiment.

In one embodiment, as illustrated in FIG. 1, the DMF chip 10 includes a plurality of EWOD electrodes 12 as well as a heating element 14. The heating element 14 may be formed from an electrically resistive material that is more electrically resistant than other electrical connections in the system. In this regard, the heating element 14 is an electrode but has a high degree of electrical resistance to enable the generation of heat. Current can be run through the heating element 14 to generate heat. At the same time, the heating element 14 also acts as a temperature sensor, specifically, a resistance temperature detector which rely on the material property temperature coefficient of resistance (TCR) to relate electrical resistance to heater temperature. As explained in more detail below, the heating element 14 may be formed form indium-tin-oxide (ITO). The heating element 14 may be patterned across its surface, for example, in a snake-like or spiral pattern. Of course, the specific configuration of the heating element 14 may vary and alternative geometries and patterns are contemplated to fall within the scope of the inventive concepts described herein.

As seen in FIG. 1, FIGS. 2A, and 2B, the DFM chip 10 includes a substrate 16 which can be made of an insulative material such as glass (e.g., glass wafer). The electrodes 12 as well as the heating element 14 may be formed from the same material such as, for instance, indium-tin-oxide (ITO), which is an optically transparent material. In this regard, the electrodes 12 and heating element 14 may be optically transparent, allowing for direct optical observation and detection techniques. The electrodes 12 and the heating element 14 are contained within a dielectric layer 17 (illustrated in FIGS. 2A and 2B). The dielectric layer 17 may include, for instance, silicon nitride. A hydrophobic layer 18 coats the upper surface of the dielectric layer 17. The hydrophobic layer 18 may include, for instance, CYTOP (amorphous fluoropolymer with optical transparency) although other materials may also be used such as polytetrafluoroethylene (PTFE). The hydrophobic layer 18 may be optionally patterned to form a permanent hydrophilic region 20 in the heating element 14 as described in more detail below. In addition, as seen in FIGS. 1, 2A, and 2B, the device includes an upper substrate 22 (e.g., glass) that disposed away from the hydrophobic layer 18 to form a gap 19 in which the droplet 28 resides. Separation of the upper substrate 22 is accomplished via one or more spacers 25 as seen in FIG. 1. A lower surface of the upper substrate 22 includes an electrode plate 24 (seen in FIGS. 2A and 2B), which may also be formed from ITO, as well as an overlying (or underlying in the orientation of FIGS. 2A and 2B) hydrophobic layer 26. The upper hydrophobic layer 26 may be thinner than the lower hydrophobic layer 18. The individual droplets 28 are then disposed in the gap 19 and sandwiched between the lower hydrophobic layer 18 and the upper hydrophobic layer 26 (except for optional hydrophilic region 20). The droplet 28 may be liquid droplets or, alternatively, gas droplets or bubbles. The particular size of the droplet 28 may vary. Generally, such droplets 28 may have volumes measured in nanoliters or microliters.

Figure 3A:
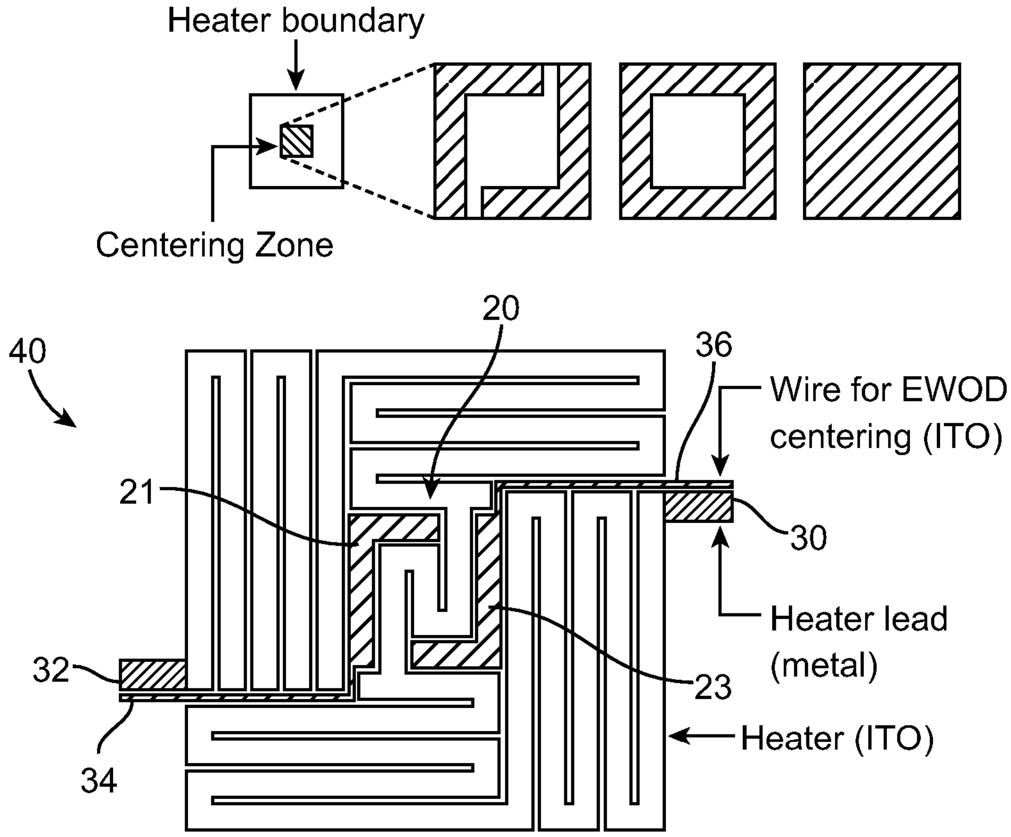
FIG. 3A illustrates a top down view of a heating element according to one embodiment that contains a EWOD switchable hydrophilic region.
Figure 3B:
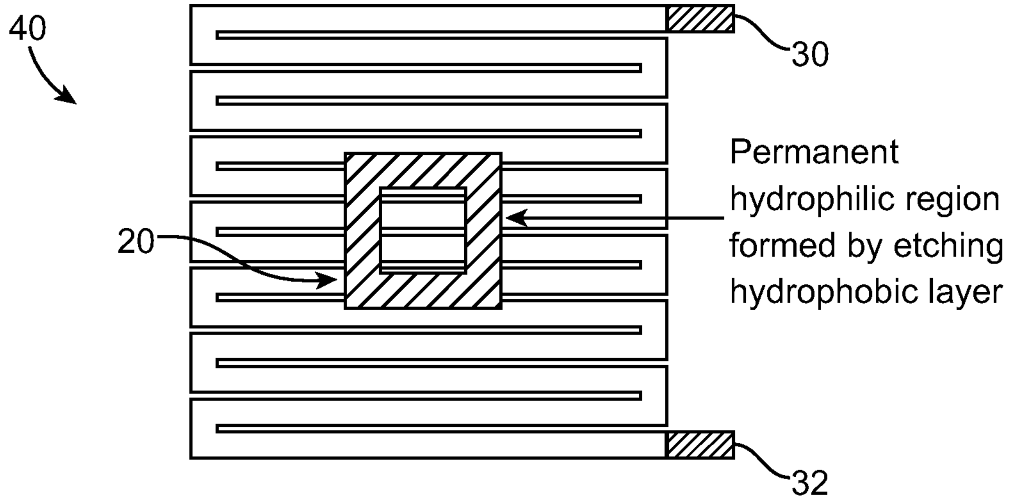
FIG. 3B illustrates a top down view of a heating element according to one embodiment that contains a permanent hydrophilic region formed by etching away a hydrophobic layer.
Figure 4A:
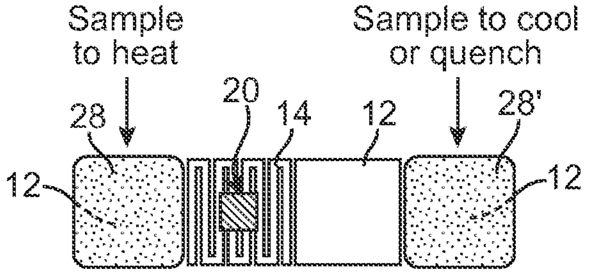
FIGS. 4A-4F illustrate an exemplary operating sequence for a locally heated chemical reaction on an EWOD-droplet DFM chip. In sequence 4A and 4B the sample that is to be heated is moved to the right on the heating element. Sequence 4C illustrates the sample located on the heating element (and centrally located over hydrophilic region). Sequence 4D illustrates the sample that is to cool or quench the heated solution is moved to the left. Also seen in sequence 4D, the volume of the sample that was heated is reduced due to evaporation. Sequences 4E and 4F illustrate the quenching or cooling sample being moved onto the heating element.
Figure 4B:
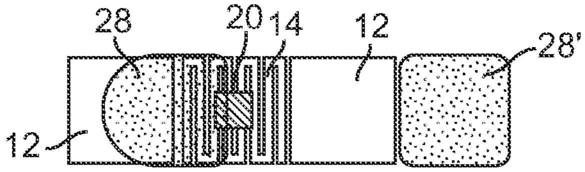
Figure 4C:
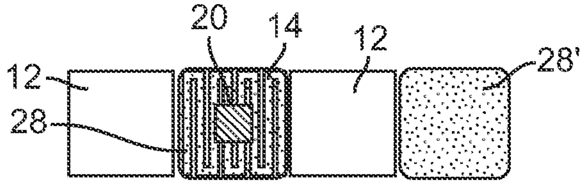
Figure 4D:
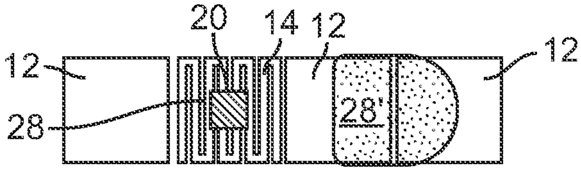
Figure 4E:
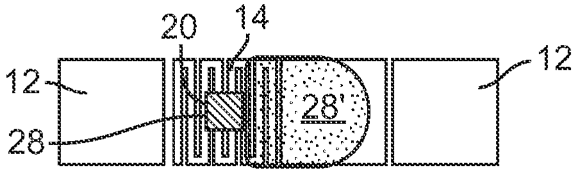
Figure 4F:
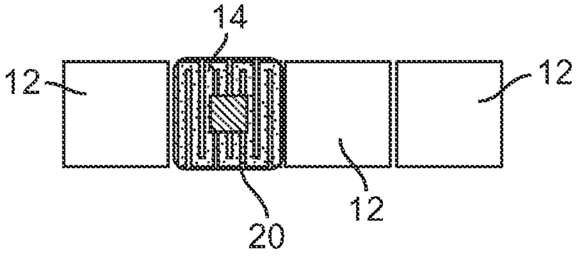

Referring to FIGS. 2A, 2B, 3A, and 3B, the heating element 14 includes a hydrophilic region 20 disposed inside the heating element 14. The hydrophilic region 20 may optionally be centered within the heating element 14 although other locations may also be used. In one aspect, the hydrophilic region 20 in the heating element 14 is permanent as illustrated in FIGS. 2A, 2B, and 3B. As one example, the hydrophilic region 20 may be formed by etching away a hydrophobic layer (e.g., CYTOP) that overlies the heating element 14. In another aspect, the hydrophilic region 20 in the heating element 14 is switchable as illustrated in FIG. 3A. In this regard, the hydrophilic region 20 is formed by having individually addressable EWOD pinning electrodes 21, 23 centrally located in the heating element 14.

Referring back to FIGS. 2A and 2B, EWOD actuation and heating/temperature sensing can be controlled separately by adjusting electrical bias levels to the electrodes 12 and the heating element 14. As seen in FIG. 2A, droplet 28 is moved in the direction of arrow A when the electrode 12 is equipotential and grounded through the droplet 28 by the upper electrode plate 24. FIG. 2A schematically illustrates the electrical circuit formed that causes movement of the droplet 28 to the right. FIG. 2B schematically illustrates the electrical circuit formed that causes resistive heating through the heating element 14. In this state, voltage is applied across the patterned heating element 14 which acts as a resistive heater. As seen in FIG. 2B, the droplet 28 is substantially centered over the central hydrophilic region 20 formed in the heating element 14.

The heating of the droplet 28 via the heating element 14 may be useful in a number of processes. For example, biochemical agents can undergo thermal cycling in which the temperature is repeatedly raised and lowered over a period of time. Heat may also be used for polymerization or other chemical reactions. The heat may also be used to evaporate some of the liquid contained in the droplet 28. This volume reduction is one way to concentrate species contained within droplets 28. Heating may also be used for growing crystals.

While the heating element 14 described above generates heat by electrical resistance to current flow, in alternative embodiments the heating element 14 may generate heat by other modes. For instance, alternative heating modes for the heating element 14 may include inductive heating, microwave or radiofrequency heating, optical heating, and the like. In addition, the heating element 14 described above is able to act as a temperature sensor by calculated via the temperature coefficient of resistance (TCR) of the material forming the heating element 14. The temperature may also be sensed by other modes which include a thermistor, resistance temperature detector (RTD), thermocouple, or the like. In addition, while the principal embodiments have been described in terms of EWOD actuation, other actuation modalities may be used that use electrodes. These include electrostatic, thermal, dielectrophoresis, surface wave, optoelectronic, and electromagnetic actuation.

FIGS. 4A-4F illustrate an exemplary thermal operating sequence for a locally heated chemical reaction on an EWOD-droplet DFM chip 10. In sequences 4A and 4B, the droplet 28 that is to be heated is moved to the right on the heating element 14. Sequence 4C illustrates the droplet 28 located on the heating element 14 (and centrally located over hydrophilic region 20). Sequence 4D illustrates the droplet 28' that is to cool or quench the heated solution is moved to the left. Also seen in sequence 4D, the volume of the droplet 28 that was heated on the heating element 14 is reduced due to evaporation. Sequences 4E and 4F illustrate the quenching or cooling droplet 28' being moved onto the heating element. As illustrated in sequences 4A-4F, the droplet 28 can be moved onto the heating element 14 by the multi-functioning electrode 12, thermally cycled with a desired temperature profile, and cooled or quenched by another droplet 28'.

It is often necessary or desirable to perform biochemical reactions using aqueous solvents in ambient conditions i.e., the sample is surrounded by air. For these cases, heating accelerates evaporation, causing rapid reduction of microscale liquid volumes. After a heated sample becomes smaller than the electrode area, a method is needed to control the location of the droplet 28. The hydrophilic region 20 located in the center of the heating element 14 serves this purpose. FIG. 3A illustrates a patterned ITO heating element 14 with heating leads 30, 32. A bias voltage applied to leads 30, 32 causes resistive heating of the heating element 14. The hydrophilic region 20 is formed by having individually addressable EWOD pinning electrodes 21, 23 centrally located in the heating element 14. Each EWOD pinning electrode 21, 23 is coupled to respective leads 34, 36. The EWOD pinning electrode 21, 23 are actuated via applied voltages to the leads 34, 36 to hold or center the evaporating droplet 28 at a given location on the heating element 14. FIG. 3B illustrates an alternative embodiment in which the hydrophilic region 20 is permanently formed in the heating element 14. In this embodiment, the overlying hydrophobic layer 18 is etched away in a pattern (e.g., square pattern of FIG. 3B) and forms a permanent hydrophilic region that can trap or hold a reduced sized droplet 28.

Figure 5A:
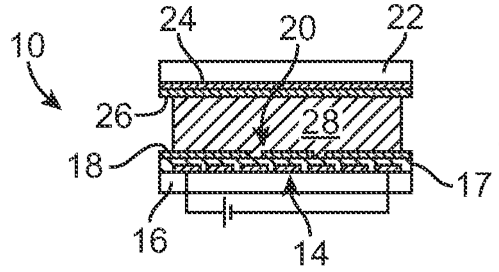
FIGS. 5A and 5B illustrate side and top down schematic views, respectively, of the progression of evaporative heating taking place with a shrinking droplet.
Figure 5B:
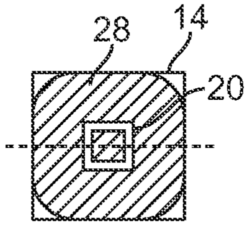
Figure 5C:
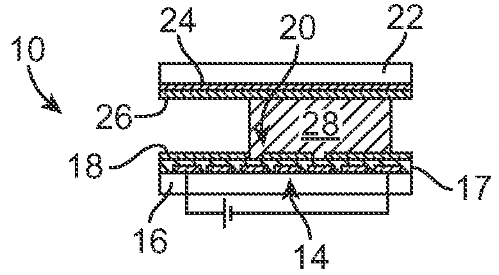
FIGS. 5C and 5D illustrate side and top down schematic views, respectively, of additional progression of evaporative heating taking place with a shrinking droplet.
Figure 5D:
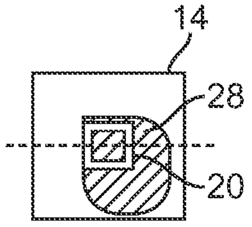
Figure 5E:
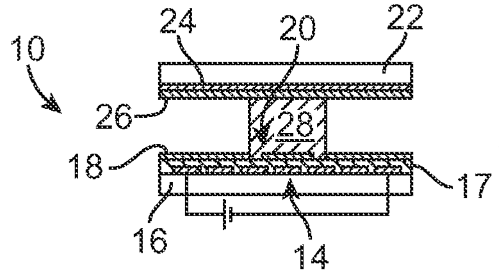
FIGS. 5E and 5F illustrate side and top down schematic views, respectively, of additional progression of evaporative heating taking place with a shrinking droplet. The droplet is shown trapped in the center of the heating element.
Figure 5F:
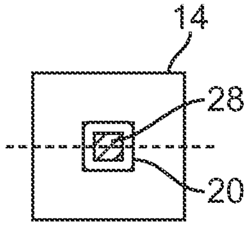

FIGS. 5A, 5C, and 5E illustrate side schematic views of a DFM chip 10 in which a droplet 28 is heated and thus evaporated. FIGS. 5B, 5D, and 5F illustrate top down views of the droplet 28 over the heating element 14 that correspond, respectively, to the views of FIGS. 5A, 5C, and 5E. FIGS. 5A and 5B illustrate the droplet 28 prior to heating. The volume of the droplet 28 is thus at its initial maximum state. FIGS. 5C and 5D illustrate the state of the droplet 28 during heating. The volume of the droplet 28 is reduced compared to its initial state. The droplet 28 is illustrated as asymmetrically covering the hydrophilic region 20 although the entirety of the hydrophilic region contains at least some portion of the reduced sized droplet 28. FIGS. 5E and 5F illustrate the state of the droplet 28 after evaporative heating has been completed. In these views, the droplet 28 has shrunk in volume to its minimum state and is entirely held within the hydrophilic region 20. The hydrophilic region 20 illustrated in FIGS. 5A-5F is of the permanent type although, as an alternative, an EWOD-switchable version could also be employed.

Figure 6:
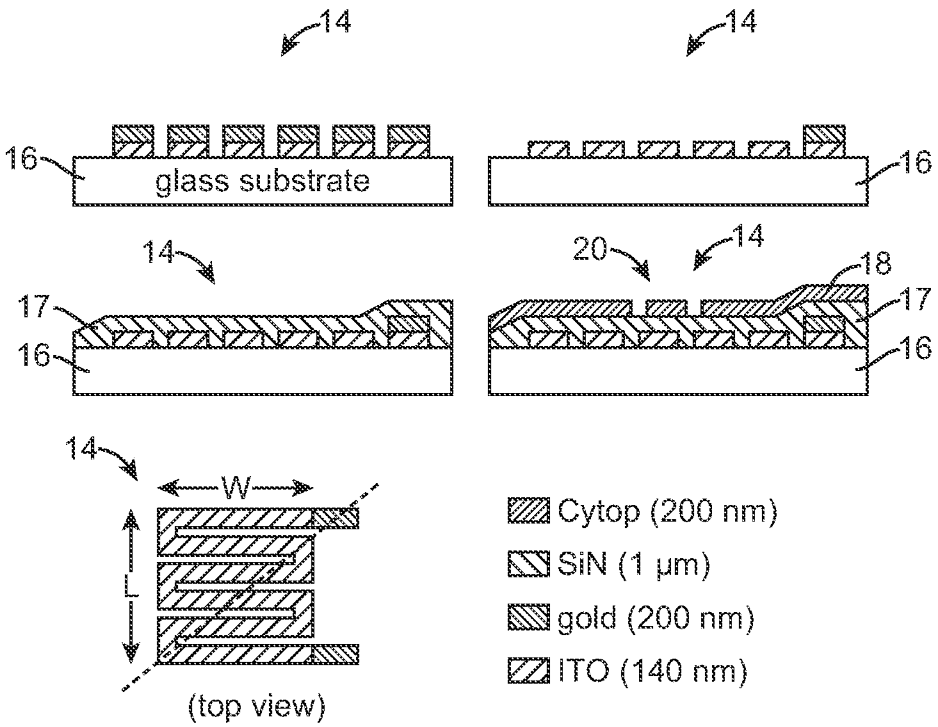
FIG. 6 illustrates a fabrication process flow for creating a heating element. Also illustrated is a top view of the heating element along with cross-sectional line for sequences (1) through (4).

FIG. 6 illustrates the flow of an exemplary fabrication process for forming the heating element 14. The fabrication steps are typical for planar EWOD devices, requiring no extra steps due to integrated heating element 14. For example, fabrication steps described in the Cho et al. publication (Journal of MEMS, Vol. 12, No. 1, 2003) incorporated by reference herein may be employed. In the heating element 14 illustrated in FIG. 6, the substrate is a 700 μm thick glass wafer that has been coated with 140 nm ITO by the manufacturer (TechGophers Co., Los Angeles, Calif.). After evaporating 200 nm gold upon a 10 nm chromium adhesion layer, photoresist (AZ 5214) is coated and patterned by UV exposure through a mask defining the ITO electrode layout for the heating element 14. Gold and chromium are wet etched, and the latter serves as the masking layer for the following wet etch of ITO in 5% wt oxalic acid, which is illustrated in the upper left panel (1) of FIG. 6. With another photoresist mask, gold and chromium are etched again to form heater leads as illustrated in the upper right panel (2) of FIG. 6. For accurate temperature sensing, i.e. resistance measurement, it is necessary to provide low-resistance electrical paths to the ITO heaters in order to ensure negligible power dissipation along lead wires; gold leads are about 100 times more conductive than ITO heating elements 14, with approximate resistances of 10 and 1000 ohms, respectively. Plasma-enhanced chemical vapor deposition (PECVD) is used to deposit 1 μm silicon nitride as illustrated in the lower left panel (3) of FIG. 6. A hydrophobic layer 18 formed from a hydrophilic polymer comprising 6% by weight of CYTOP is spin-coated at 200 rpm to yield a 200 nm hydrophobic layer 18. Optionally, the hydrophobic layer 18 is etched by oxygen plasma to form a hydrophilic region 20 on the heating element 14 as illustrated in lower right panel (4) of FIG. 6. The upper substrate 22 (illustrated in FIGS. 1, 2A, 3B, 5A, 5C, and 5E) is fabricated by spin-coating 200 nm CYTOP onto an ITO-coated glass wafer. In this regard, the 200 nm CYTOP layer is the hydrophobic layer 26 while the ITO layer on the glass is the electrode plate 24.

Figure 7:
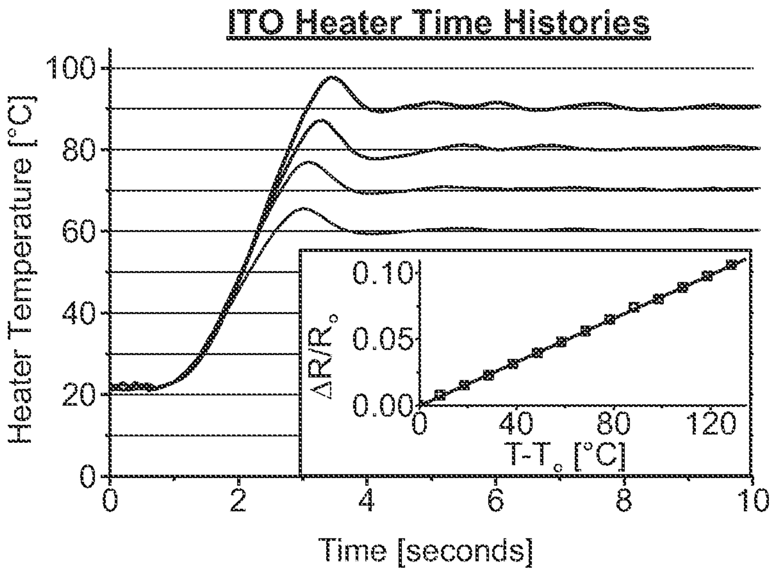
FIG. 7 illustrates ITO heating element time histories for temperature set points of 60° (bottom graph), 70° (second from bottom graph), 80° (third from bottom graph), and 90° (top graph). Also illustrated is the TCR calibration curve between the temperatures of 22° C. to 152° C.

The heating elements 14 are designed such that they are about 100 times more resistive than any other electrical connections in the system. Therefore, they double as accurate thermistors, or resistance temperature detectors, which rely on the material property temperature coefficient of resistance (TCR) to relate electrical resistance to heater temperature. The inset in FIG. 7 is a representative TCR calibration curve for ITO-based heating elements 14. For the testing range of 22° C. to 152° C. resistance varies linearly with temperature. FIG. 6 illustrates temperature time histories from experiments using 3×3 mm (dimensions are L×W of FIG. 6) heating elements 14 under 1 μL water droplets sandwiched by a top plate placed 100 μm above the substrate. Set points were reached within a few seconds and maintained to within about ±1° C. once stable, about eight seconds after the initial rise.

FIG. 8 illustrates a system diagram of an on-chip proteomics system 100 that includes sample processing and characterization by matrix-assisted laser desorption/ionization mass spectrometry (MALDI-MS). The system 100 includes two main sub-systems including a first sub-system 102 that controls EWOD electrode 12 actuation and heating element 14 control and temperature sensing. A second sub-system 104 which contains the MALDI time-of-flight MS device 106 performs chemical analysis results of which may be transferred back to the first sub-system 102. A personal computer 108 runs software in LabView to simultaneously control multiplex EWOD electrode 12 and the heating element(s) 14. All the functionalities of EWOD with local Joule heating and thermistor sensing are controlled by electrical signals (i.e., upon sample loading the DFM chip 10 operates solely according to wire-borne commands). A waveform generator 110 generates a voltage signal that is amplified via voltage amplifier 112. Actuation signals are administered by a DAQ-controlled home-built multiplexer 114 (National Instruments DAQPad 6507). Heater temperatures are maintained by proportional-integral-derivative (PID) control based on resistance measurements, sampled at 10 Hz by the DC source 116 (Keithley 2425 SourceMeter). A communications bus 118 interfaces with the DFM chip 10. Chemical samples are generated, transported, mixed, and heated on the DFM chip 10, which is loaded directly into the chamber of the MALDI time-of-flight mass spectrometer 106 for characterization (Voyager-DE STR MALDI-TOF Mass Spectrometer). EWOD actuation and heating/temperature sensing can be controlled separately by adjusting electrical bias levels. Each multi-functioning electrode 12 and heating element 14 has two leads, which are at the same potential during actuation, and biased during heating as explained herein.

EXPERIMENTAL PROCEDURE

Macroscale proteomics sample preparation steps, e.g. reduction and alkylation, are often performed at elevated temperatures, usually between 30° C. and 70° C. In this experiment, an on-chip proteomics system 100 utilized EWOD with localized temperature control to perform an automated protocol for insulin disulfide reductions at various temperatures. The DFM chip 10 has three separate heating sites as illustrated in FIG. 9, which also serve as MALDI targets after matrix crystallization. Video frames depicting the automated thermal processing sequence are shown in FIGS. 10A-10F. Prior to installation of the device top plate, sample reservoirs A, B, and C were loaded with working fluids by pipette. After top plate placement, sample preparation steps were carried out automatically by a LabView program controlling EWOD actuation (40 to 60 rms volts at 1 kHz) and thermal cycling (direct current).

During the first step, illustrated in FIG. 10A, approximately 500 nL droplets of insulin from reservoir A and reducing agent dithiothreitol (DTT) in 50% aqueous acetonitrile from reservoir B were created and merged, forming a 1 μL droplet having initial concentrations of 0.5 μM insulin and 25 mM DTT. The combined sample was mixed by moving back and forth three times along the path shown by black arrows in FIG. 10B. In the next step, the mixed sample was loaded onto a heating site as illustrated in FIG. 10C. During heating for 180 seconds at a heater temperature of 70° C. (FIGS. 10D and 10E), the sample evaporated rapidly, reducing in volume from ~1 μL to ~60 nL. This resulted in a ~95% increase in concentration.

As can be seen in FIG. 10E, the heated sample remains centered on the heating element 14. This position control was obtained by the hydrophilic region 20 (small dark square rings in the schematic), which keep the droplets 28 pinned during evaporation. In FIG. 10F, a 700 nL droplet of MALDI matrix, 2,5-dihydroxybenzoic acid (DHB, 3 mg/mL) in 50% aqueous acetonitrile and 0.1% trifluoroacetic acid (TFA), was moved from the far-right reservoir C to the heating element 14. After preparing two more samples by the same process, the top plate was removed and crystallization occurred during solvent evaporation.

Merging the acidic DHB solution with the heated sample effectively quenches the disulfide reduction, providing a well-controlled reaction time. This quenching effect was confirmed by a control experiment showing no significant reduction for a sample in which all solutions were combined with DHB before heating at 70° C., a temperature which yields high reduction efficiency using the protocol shown in FIGS. 10A-10F.

Figures 11A, 11B, 11C:
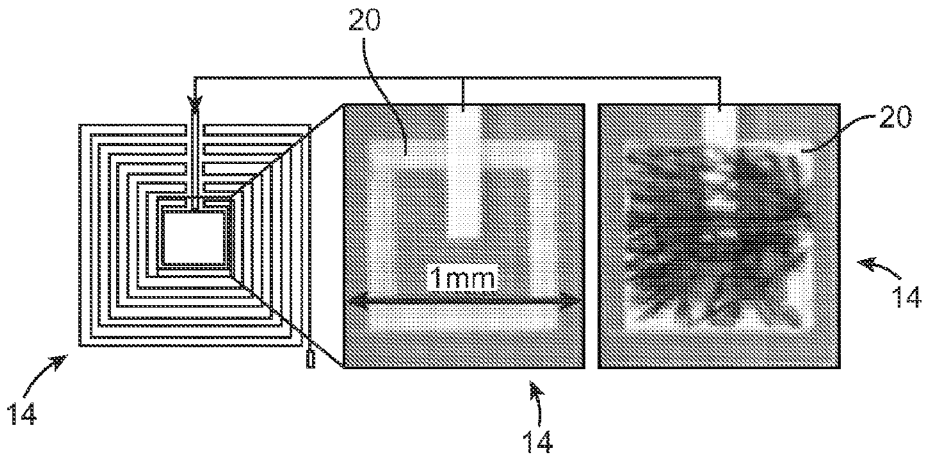
FIG. 11A illustrates a heating element schematic representation according to one embodiment.
FIG. 11B illustrates a magnified view of a "clean" hydrophilic region of the heating element.
FIG. 11C illustrates a magnified view of dry DHB crystal grown over the hydrophilic region.

Hydrophilic ring patterns centered on the heating element 14 play a central role in device design by providing control of heated sample location and enhanced matrix crystal growth. Droplet centering was accomplished by both permanent and switchable hydrophilic regions 20; the former were formed by etching CYTOP, and the latter were formed by having individually addressable EWOD pinning electrodes 21, 23 centrally located in the heating element 14. Desirable shard-like morphologies were observed on permanent hydrophilic patches. FIG. 11A illustrates a heating element 14 schematic used to generate DHB crystals. FIG. 11B illustrates a clean heating element 14 with ring pattern while FIG. 11C illustrates the same heating element 14 with DHB crystals grown at room temperature. It was observed that in most cases, crystals grown on square rings originate from nucleation sites on hydrophilic regions 20 and grow over surrounded hydrophobic patches. The final structure (FIG. 11C) provides a good MALDI target, i.e. shard-like crystals yielded good spectra.

A series of insulin disulfide reduction experiments were carried out using the protocol of FIGS. 10A-10F in order to observe how reaction efficiency varies with heater temperature. Samples were processed three per DFM chip 10 using different temperatures, from 22° C. to 70° C. After room temperature crystallization, which took approximately fifteen minutes, the DFM chip 10 was loaded directly into the chamber of the mass spectrometer 106 on a normal sample holder that had been milled to compensate for the wafer thickness.

Insulin disulfide reductions were performed at 130° C. in 50% DMSO, which in its pure form has a boiling point of 189° C. Due to its extremely low evaporation rate compared to water, room temperature crystallization was too slow. Therefore, upon top plate removal, heaters were maintained at 90° C. until crystals were observed. This hot crystallization yielded shard-like morphologies much like those grown at room temperature from water. There was no confirmation that DMSO was completely evaporated before loading the DFM chip 10 into the mass spectrometer 106, but the crystals yielded very good spectra. It is possible that any remaining liquid evaporated in the MALDI chamber, which is under vacuum.

Disulfide reduction of insulin breaks the molecule into its constitutive a- and b-chain polypeptides. For a sample containing insulin and a reducing agent, the reduction efficiency can be approximated using MALDI-MS spectra by comparing signal intensities of intact insulin and b-chain peaks. An intensity ratio was defined ($I_{intact\ insulin}/I_{b\text{-}chain}$), which is equal to the intact molecule peak intensity divided by that of the b-chain peak.

Figure 12:
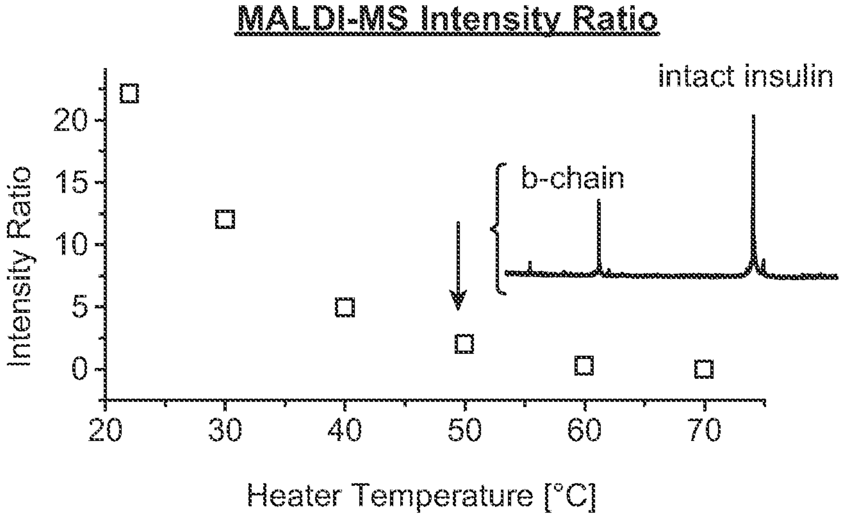
FIG. 12 illustrates the MALDI-MS spectra intensity ratio vs. heater temperature for 1 μl samples heated for 180 seconds. A representative spectrum from the 50° C. case shows b-chain and intact insulin peaks.

FIG. 12 has a representative spectrum for the 50° C. case showing b-chain and intact insulin peaks; they were observed at approximately 5740 Da and 3400 Da, respectively. MALDI-MS data for 1 μL samples on heaters at temperatures from 22° C. to 70° C. for 180 seconds is summarized by a plot of intensity ratios in FIG. 12 and it shows improved disulfide reduction efficiency with increasing temperature.

Figure 13:
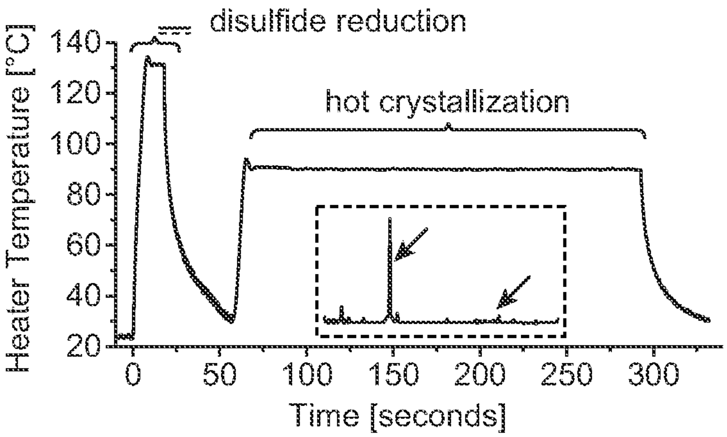
FIG. 13 is a time history for 1 μL 50% DMSO sample with reaction at 130° C. and crystallization at 90° C. The corresponding MALDI-MS spectrum is shown inside the dashed box and indicates a nearly complete reduction, evidenced by a large b-chain peak (left arrow) and a tiny intact insulin peak (right arrow).

The above results represent a simple temperature study in which samples were prepared automatically in multiplex fashion by EWOD with local integrated heating. It demonstrates the ability to thermally cycle discrete droplets surrounded by air, with control over heating and chemical reaction times. Elevated temperatures are necessary for not only thermally cycling, but also evaporating high boiling point solvents within practical timeframes, which is desirable for MALDI-MS characterization. Disulfide reductions were performed using the protocol shown in FIGS. 10A-10F with 0.25 μM insulin and 12 mM DTT in 50% DMSO instead of aqueous acetonitrile. FIG. 13 shows a representative heater time history. A set point of 130° C. was maintained for about ten (10) seconds during disulfide reduction and 90° C. for about two hundred fifty (250) seconds during hot crystallization. Fast insulin disulfide reductions in DMSO yielded encouraging results, showing that local high-temperature cycling of droplets makes it possible to prepare samples for MALDI-MS characterization in about five minutes.

The devices and methods described herein enable the facile integration of localized temperature control on a microfluidic chip that has thin-film electrodes on or near the surface. As an example, EWOD chip functionalities now include heating of liquid droplets in a gas/vapor medium, where evaporation is a factor, with control of sample location. Key virtues of this method and device include: (1) the fact that the addition of heating and temperature sensing capabilities does not lengthen or complicate the fabrication process, (2) heated sample location is controlled via switchable or permanent hydrophilic regions; (3) the device has low power consumption, (4) the device has integrated sample location control as well as integrated temperature control, (5) the device is scalable and reconfigurable to suit many different needs.

While embodiments of the present invention have been shown and described, various modifications may be made without departing from the scope of the present invention. The invention, therefore, should not be limited, except to the following claims, and their equivalents.

What is claimed is:

1. A microfluidic device for droplet manipulation comprising:
- a substrate;
- a plurality of electrically addressable electrodes disposed on the substrate, at least one of the plurality of electrodes comprising a heating element in the form of a patterned electrode; and
- a hydrophilic region disposed in or above a portion of the heating element.

2. The microfluidic device of claim 1, wherein the heating element also comprises a temperature sensor.

3. The microfluidic device of claim 1, wherein the plurality of electrically addressable electrodes disposed on the substrate comprises EWOD actuated electrodes.

4. The microfluidic device of claim 1, wherein the hydrophilic region comprises an etched region in a hydrophobic layer located on or above the heating element.

5. The microfluidic device of claim 1, wherein the hydrophilic region comprises a plurality of pinning electrodes centrally located in the heating element.

6. The microfluidic device of claim 1, wherein the plurality of electrically addressable electrodes comprise ITO.

7. The microfluidic device of claim 1, further comprising a mass spectrometer configured to analyze species deposited on or above the heating element.

8. A method of heating a droplet comprising:
- moving a droplet over a plurality of electrically addressable electrodes disposed on the substrate, at least one of the plurality of electrodes comprising a heating element in the form of a patterned electrode, wherein the droplet is stopped on or above the at least one heating element; and
- applying an electrical current to the at least one heating element to heat the droplet.

9. The method of claim 8, further comprising measuring the temperature of the droplet with the at least one heating element.

10. The method of claim 8, further comprising actuating a hydrophilic region disposed on or above the heating element.

11. The method of claim 8, wherein a hydrophilic region is permanently located on or above the heating element.

12. The method of claim 8, wherein the droplet comprises a liquid and current is applied to the at least one heating element to reduce the volume of the droplet.

13. The method of claim 12, further comprising precipitating a solid on or above the heating element by evaporating substantially all the liquid from the droplet.

14. The method of claim 8, further comprising quenching the heated droplet with a secondary cooling droplet.

15. A microfluidic chip comprising:
- a lower substrate;
- a plurality of electrically addressable EWOD electrodes disposed on the lower substrate, at least one of the plurality of EWOD electrodes comprising a heating element in the form of a patterned electrode also comprising resistance temperature detector; and an upper substrate disposed away from the lower substrate via one or more interposed spacers.

16. The microfluidic chip of claim 15, further comprising a hydrophilic region disposed in or above a portion of the heating element.

17. The microfluidic chip of claim 15, wherein the hydrophilic region comprises a permanent feature on the microfluidic chip.

18. The microfluidic chip of claim 15, wherein the hydrophilic region comprises an electronically actuable feature on the microfluidic chip.

19. The microfluidic chip of claim 17, wherein the hydrophilic region comprises an etched region of a hydrophobic surface.

20. The microfluidic chip of claim 18, wherein the electronically actuable feature comprises a pair of pinning electrodes.

* * * * *

UNITED STATES PATENT AND TRADEMARK OFFICE

CERTIFICATE OF CORRECTION

PATENT NO. : 8,459,295 B2
APPLICATION NO. : 13/144462
DATED : June 11, 2013
INVENTOR(S) : Kim et al.

It is certified that error appears in the above-identified patent and that said Letters Patent is hereby corrected as shown below:

In the Specification

Col. 1, Line 21 replace “Grant No. F32EB003696, awarded by the National Institutes” with -- Grant No. EB003696 awarded by the National Institutes --

Col. 1, Line 22 replace “The Government has certain rights in this invention” with -- The Government has certain rights in the invention --

Signed and Sealed this
Third Day of June, 2014

Michelle K. Lee
*Deputy Director of the United States Patent and Trademark Office*